US008787236B2

(12) United States Patent
Mao et al.

(10) Patent No.: US 8,787,236 B2
(45) Date of Patent: Jul. 22, 2014

(54) METHOD AND SYSTEM FOR SENDING AND TRANSMITTING MBMS PAGING INDICATION SIGNALING

(75) Inventors: Lei Mao, Shenzhen (CN); Zijiang Ma, Shenzhen (CN); Jianxun Ai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 247 days.

(21) Appl. No.: 13/257,875

(22) PCT Filed: Apr. 15, 2010

(86) PCT No.: PCT/CN2010/071789
§ 371 (c)(1),
(2), (4) Date: Mar. 27, 2012

(87) PCT Pub. No.: WO2011/038587
PCT Pub. Date: Apr. 7, 2011

(65) Prior Publication Data
US 2012/0188930 A1      Jul. 26, 2012

(30) Foreign Application Priority Data

Sep. 29, 2009  (CN) .......................... 2009 1 0178915
Nov. 6, 2009   (CN) .......................... 2009 1 0212361

(51) Int. Cl.
H04H 20/71     (2008.01)
H04W 72/00     (2009.01)
H04L 5/00      (2006.01)
H04W 68/02     (2009.01)

(52) U.S. Cl.
CPC ........... *H04W 72/005* (2013.01); *H04L 5/0091* (2013.01); *H04L 5/0053* (2013.01); *H04W 68/025* (2013.01)
USPC ....................................... 370/312

(58) Field of Classification Search
CPC ........ H04H 20/71; H04H 40/00; H04L 12/18; H04L 49/201; H04W 16/00
USPC ................. 370/311, 322, 329, 437; 455/3.06, 455/414.1, 422.1, 437
See application file for complete search history.

(56) References Cited

U.S. PATENT DOCUMENTS 7,558,228 B2   7/2009   Lee et al.
(Continued)

FOREIGN PATENT DOCUMENTS

CN         101370238 A      2/2009
(Continued)

OTHER PUBLICATIONS

International Search Report in international application No. PCT/CN2010/071789, mailed on Jul. 22, 2010.
(Continued)

*Primary Examiner* — Raj Jain
(74) *Attorney, Agent, or Firm* — Oppedahl Patent Law Firm LLC

(57) ABSTRACT

A method and system for sending and transmitting a Multimedia Broadcast Multicast Service (MBMS) paging indicating signaling are disclosed. A network side assigns bit resource which bearing an Multipoint Control Channel (MCCH) modification indication for each MCCH according to the available resource of paging indicating signaling and the maximum number of MCCHs supported by a cell, and configures mapping information of each MCCH modification indication on the paging indicating signaling; the network side makes the MCCH modification indication corresponding to the configured MCCH included in the paging indicating signaling before transmitting the paging indicating signaling. The subject application can be applied to a cell having a plurality of MCCHs and is not suffered from the number change of the MCCHs. The application can be easily carried out. The application can be easily carried out, and the UE determines whether the content of the MCCH has changed only according to the MCCH modification indication corresponding to the MCCH concerned by the UE.

9 Claims, 1 Drawing Sheet

(56) References Cited

U.S. PATENT DOCUMENTS

| | | |
|---|---|---|
| 2005/0237960 A1* | 10/2005 | Kim ............................ 370/312 |
| 2009/0196197 A1 | 8/2009 | DiGirolamo et al. |
| 2010/0048124 A1 | 2/2010 | Lee et al. |
| 2010/0303023 A1* | 12/2010 | Nader .......................... 370/329 |

FOREIGN PATENT DOCUMENTS

| | | |
|---|---|---|
| CN | 101541045 A | 9/2009 |
| RU | 2189113 C1 | 9/2002 |
| RU | 2369014 C1 | 9/2009 |
| WO | 2008023928 A2 | 2/2008 |
| WO | 2011011975 A1 | 2/2011 |

OTHER PUBLICATIONS

English Translation of the Written Opinion of the International Search Authority in international application No. PCT/CN2010/071789, mailed on Jul. 22, 2010.

3GPP TSG-RAN WG2#61 R2-081118 Feb. 11-15, 2008.

3GPP TSG-RAN WG2 Meeting #60bis R2-080205 Jan. 14-18, 2008.

3GPP TSG RAN WG2 #67, Huawei, PDCCH for MCCH Notification, Shenzhen, Aug. 24, 2009, 4 total pages.

* cited by examiner

METHOD AND SYSTEM FOR SENDING AND TRANSMITTING MBMS PAGING INDICATION SIGNALING

TECHNICAL FIELD

The present disclosure relates to the field of a Long Term Evolution (LTE) system, in particular to a method and system for sending and transmitting Multimedia Broadcast Multicast Service (MBMS) paging indication signaling.

BACKGROUND

Along with the rapid development of Internet and the popularity of large-screen multi-functional mobile phones, a large number of mobile data multimedia services and various kinds of high-bandwidth multimedia services, such as video conference, television broadcast, video on demand, advertisement, online education, interactive game and the like, have appeared. On one hand, this satisfies the rising service needs of mobile users, and also brings new service growth points for a mobile operator. The mobile data multimedia service requests that a plurality of users can receive the same data at the same time. Compared to the general data service, the mobile data multimedia service has the features of large volume of data, long duration, sensitive time delay and the like.

In order to use the mobile network resource effectively, the $3^{rd}$ Generation Partnership Project (referred to as 3GPP) puts forward an MBMS service. The service is a technology to transmit data from a data source to a plurality of targets, realizes the sharing of the network (including core network and access network) resource and improves the utilization rate of the network resource (in particular the air interface resource). The MBMS defined by 3GPP not only can realize message multicasting and broadcasting in a plain text form at a low rate, but also can realize multicasting and broadcasting of high speed multimedia service and provide a variety of video, audio and multimedia services. This undoubtedly conforms to the trend of future mobile data development and provides a better service prospect for the development of 3G.

The MBMS service is characterized by large volume of data, long duration for a UE (User Equipment) reception and constant average data rate. The above features determine that the scheduling of the MBMS service and control signaling configuration are semi-static, that is, the scheduling information of the MBMS service and control signaling information keep unchanged for a long time; so the system side transmits an unchanged information (continuous transmission is because a new user may access at any time) in a cycle of each MCCH (maximum Multipoint Control Channel) information. In this way, it is unnecessary for a UE having received the MCCH information to receive unchanged MCCH information every time, which will cause the UE to consume electricity; because the amount of MCCH information is large, more electricity will be consumed during the information reception and analysis. As a result, it is put forward to add MCCH information update indication information (referred to as MCCH change notification or MBMS notification indicator in English, MBMS notification message, MBMS notification information, MBMS notification indication or MBMS notification indication information and the like in Chinese; thereinafter the MBMS notification indication information taken as example), describes by a small amount of physical layer information whether the MCCH information has changed, so that the accessed UE only needs to monitor a small amount of information and then determines whether to receive the MCCH information according to the MBMS notification indication information, which plays the effect of saving electricity.

Additionally, since the MBMS service transmitted in a cell can belong to different MBMS service sending areas, that is, the MBMS service sending areas may be overlapped, in an evolved MBMS (eMBMS) system, there may be a plurality of MCCHs in one cell; each MCCH corresponds to a different MBMS service sending area, in which control information of the MBMS service which is sent corresponding to the MBMS service sending area is only borne. The number of the MCCHs depends on the MBMS service generating area of the service assigned in the cell. Therefore, the number of the MCCHs is changeable. At present, the agreement stipulates that a cell supports to the maximum of 8 MBMS service sending areas. That is to say, a cell supports to the maximum of 8 MCCH channels.

In LTE, it has already been determined to introduce the MBMS notification indication information nowadays. However, no conclusion has been reached about the problems that on which physical control channel the MBMS notification indication information will be borne, how to support the notification of a plurality of MCCHs, etc.

SUMMARY

The technical problem to be solved by the disclosure is to provide a method and system for sending and transmitting MBMS paging indication signaling and present a mapping method for bearing the MBMS notification indication information to conveniently realize an indication whether the content of the MCCH has changed in system information (i.e., the MBMS notification indication information).

To solve the technical problem above, the present disclosure provides a method for transmitting Multimedia Broadcast Multicast Service (MBMS) paging indication signaling, the method includes:

assigning, by a network side, bit resource which bears a Multipoint Control Channel (MCCH) modification indication for each MCCH according to available resources of paging indication signaling and a maximum number of MCCHs supported by a cell, and configuring mapping information of each MCCH modification indication in the paging indication signaling by the network side; and the MCCH modification indication corresponding to the configured MCCH being included in the paging indication signaling which is transmitted by the network side.

The above method may further have the following features:

the available resource of the paging indication signaling is a Physical Downlink Control Channel (PDCCH) which bears the paging indication signaling.

The above method may further have the following features:

in step of transmitting the paging indication signaling by the network side, the network side continuously or separately populates the PDCCH with the MCCH modification indication corresponding to the configured MCCH; and the mapping information of the each MCCH modification indication in the paging indication signaling is an arrangement order and an initial position, on the PDCCH, of the MCCH modification indication corresponding to each configured MCCH.

The above method may further have the following features:

the arrangement order of the MCCH modification indication on the PDCCH is the order of each MCCH appears when a plurality of MCCHs are configured in a system message; and in the step of transmitting the paging indication signaling by the network side, the network side populates a corresponding position on the PDCCH with the MCCH modification indication corresponding to the configured MCCH, and populates a position, where the MCCH modification indication corresponding to the unconfigured MCCH is located, with an invalid value.

The above method may further have the following features:

the arrangement order of the MCCH modification indication on the PDCCH is the bit position determined by values of MCCH identifications corresponding to all the MCCHs or values of MBMS single frequency network area identifications corresponding to all the MCCHs;

in the step of transmitting the paging indication signaling by the network side, the network side populates a corresponding position on the PDCCH with the MCCH modification indication corresponding to the configured MCCH, and populates a position, where the MCCH modification indication corresponding to the unconfigured MCCH is located, with an invalid value; and the method may further comprise that: the MBMS identification or single frequency network area identification of each configured MCCH is included in the system information which is transmitted by the network side.

The above method may further have the following features:

the arrangement order of the MCCH modification indication on the PDCCH is the order in which the MCCH identification or the MBMS single frequency network area identification corresponding to the configured MCCH are orderly arranged from small to large or from large to small;

in the step of transmitting the paging indication signaling by the network side, the network side populates a corresponding position on the PDCCH with the MCCH modification indication corresponding to the configured MCCH, and populates a position, where the MCCH modification indication corresponding to the unconfigured MCCH is located, with an invalid value; and the method may further comprise that: each configured MCCH identification or MBMS single frequency network area identification is included in the system information which is transmitted by the network side.

The method may further include that:

presetting, in each UE of the cell, the bit resource assigned by the network side for each MCCH modification indication and the mapping information of each MCCH modification indication in the paging indication signaling, or transmitting them to each UE through the system information by the network side.

To solve the technical problem above, the present disclosure provides a method for transmitting a Multimedia Broadcast Multicast Service (MBMS) paging indication signaling, the method includes:

assigning bit resource which bears a Multipoint Control Channels (MCCH) modification indication for each MCCH by a network side according to available resources of paging indication signaling and a maximum number of MCCHs supported by a cell, and configuring mapping information of each MCCH modification indication in the paging indication signaling by the network side; and the MCCH modification indication corresponding to the configured MCCH being included in the paging indication signaling which is transmitted by the network side; and determining, by a UE, whether the content of each configured MCCH has changed according to the received MCCH modification indication corresponding to each MCCH.

The above method may further have the following characteristic:

the available resource of the paging indication signaling is a Physical Downlink Control Channel (PDCCH) which bears the paging indication signaling.

The above method may further have the following features:

in the step of transmitting the paging indication signaling by the network side, the network side continuously or separately populates the PDCCH with the MCCH modification indication corresponding to the configured MCCH; and the mapping information of the each MCCH modification indication in the paging indication signaling is an arrangement order and an initial position, on the PDCCH, of the MCCH modification indication corresponding to each configured MCCH.

The above method may further have the following features:

the arrangement order of the MCCH modification indication on the PDCCH is the order of each MCCH appears when a plurality of MCCHs are configured in a system message; and in the step of transmitting the paging indication signaling by the network side, the network side populates a corresponding position on the PDCCH with the MCCH modification indication corresponding to the configured MCCH, and populates a position, where the MCCH modification indication corresponding to the unconfigured MCCH is located, with an invalid value.

The above method may further have the following features:

the arrangement order of the MCCH modification indication on the PDCCH is the bit position determined by values of MCCH identifications corresponding to all the MCCHs or values of MBMS single frequency network area identifications corresponding to all the MCCHs; or, the arrangement order of the MCCH modification indication on the PDCCH is the order in which the MCCH identifications or the MBMS single frequency network area identifications corresponding to the configured MCCHs are orderly arranged from small to large or from large to small;

in the step of transmitting the paging indication signaling by the network side, the network side populates a corresponding position on the PDCCH with the MCCH modification indication corresponding to the configured MCCH, and populates a position, where the MCCH modification indication corresponding to the unconfigured MCCH is located, with an invalid value; and the method may further comprise that: the MBMS identification or single frequency network area identification of each configured MCCH is included in the system information which is transmitted by the network side.

The method may further include:

presetting, in each UE of the cell, the bit resource assigned by each MCCH modification indication and the mapping information of each MCCH modification indication in the paging indication signaling, or transmitting them to each UE through the system information by the network side.

To solve the technical problem above, the present disclosure provides an apparatus for transmitting a Multimedia Broadcast Multicast Service (MBMS) paging indication signaling, which is applied to a network side, and the apparatus includes: a configuration module and a transmitting module, which are connected with each other;

the configuration module is configured to assign bit resource which bears a Multipoint Control Channels (MCCH) modification indication for each MCCH according to the available resource of paging indication signaling and a maximum number of MCCHs supported by a cell, and configure mapping information of each MCCH modification indication in the paging indication signaling; and the transmitting module is configured to make the MCCH modification indication corresponding to the configured MCCH included in the paging indication signaling before transmitting the paging indication signaling.

Preferably, the transmitting module is further configured to preset, in each UE of the cell, the bit resource occupied by each MCCH modification indication and the mapping information of each MCCH modification indication in the paging indication signaling, or transmit them to each UE through system information.

To solve the technical problem above, the disclosure provides a system for transmitting a Multimedia Broadcast Multicast Service (MBMS) paging indication signaling, which includes a network side and a UE; wherein the network side is configured to assign bit resource which bears a Multipoint Control Channels (MCCH) modification indication for each MCCH according to the available resource of paging indication signaling and a maximum number of MCCHs supported by a cell, and configure mapping information of each MCCH modification indication in the paging indication signaling; the network side is further configured to make the MCCH modification indication corresponding to the configured MCCH included in the paging indication signaling before transmitting the paging indication signaling; and the UE is configured to determine whether the content of each configured MCCH has changed according to the received MCCH modification indication corresponding to each MCCH.

To solve the technical problem above, the disclosure provides a UE for transmitting Multimedia Broadcast Multicast Service (MBMS) paging indication signaling, the UE is configured to learn mapping information of each MCCH modification indication in the paging indication signaling and receive the MCCH modification indication from a network side; and the UE is configured to determine whether the content of each configured MCCH has changed according to the received MCCH modification indication corresponding to each MCCH.

Preferably, the UE is configured to learn mapping information of each MCCH modification indication by means of system information received from a network side, or by means of that the network side presetting the mapping information in the UE.

To sum up, the present disclosure provides a system and method for sending and transmitting an MBMS paging indication signaling, which can be applied to the scenario in which there have a plurality of MCCHs in a cell and are not suffered from the number change of the MCCHs. The disclosure can be easily carried out, and the UE determines whether the content of the MCCH has changed only according to the MCCH modification indication corresponding to the MCCH concerned by the UE.

DETAILED DESCRIPTION

Figure 1:
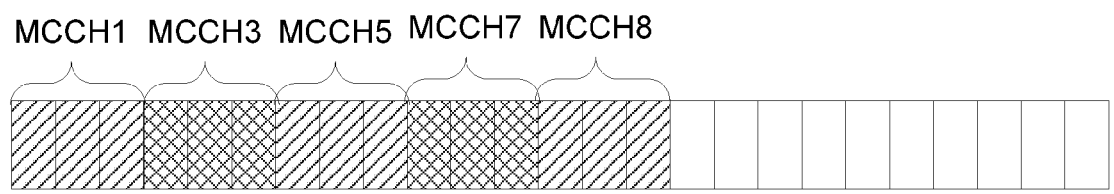
FIG. 1 is a diagram showing the mapping of the MCCH modification indication corresponding to the configured MCCH to the PDCCH in embodiment one of the disclosure.

The physical channel which may bear the MBMS notification indication information includes the Physical Downlink Control Channel (PDCCH). Format 1A or 1C of PDCCH Downlink Control Information (DCI) in an LTE system can be used for bearing a paging message of general service, wherein the size of information that format 1A can bear is 25 bits (system bandwidth 5 M), 27 bits (system bandwidth 10 M) or 28 bits (system bandwidth 20 M); the size of information that format 1C can bear is 12 bits (system bandwidth 5 M), 13 bits (system bandwidth 10 M) or 15 bits (system bandwidth 20 M). In order to save the resource, PDCCH DCI format 1C can be adopted to bear the MBMS notification indication information; in order to further improve the accuracy of transmitting information, PDCCH DCI format 1A can be adopted.

The disclosure provides a system and method for sending and transmitting an MBMS paging indication signaling. A network side assigns bit resource which bears an MCCH modification indication for each MCCH according to the available resource of paging indication signaling and the maximum number of MCCHs supported by a cell, and configures mapping information of each MCCH modification indication in the paging indication signaling; the network side makes the MCCH modification indication corresponding to the configured MCCH included in the paging indication signaling before transmitting the paging indication signaling. The available resource of the paging indication signaling is the Physical Downlink Control Channel (PDCCH) bearing the MBMS paging indication information. The MBMS notification indication information is composed of one or more MCCH modification indications in the paging indication signaling. The paging indication signaling is also called as MBMS paging information or MBMS paging signaling.

System Embodiments

Embodiment One:

This embodiment provides a system for transmitting an MBMS paging indication signaling, including a network side; wherein the network side is configured to assign a bit resource which bears an MCCH modification indication for each MCCH according to the available resource of paging indication signaling and the number of MCCHs supported by a cell, and configure mapping information of each MCCH modification indication in the paging indication signaling; one MCCH occupies one bit (or more bits) with all bits being arranged in order; the network side is further configured to make the MCCH modification indication corresponding to the configured MCCH included in the paging indication signaling before transmitting the paging indication signaling; and the network side is further configured to preset the bit resource occupied by each MCCH modification indication and the mapping information of each MCCH modification indication in the paging indication signaling in each UE of the cell, or transmit them to each UE through system information.

The embodiment provides an apparatus for transmitting a Multimedia Broadcast Multicast Service (MBMS) paging indication signaling, which is applied to the network side and includes: a configuration module and a transmitting module, which are connected with each other; wherein the configuration module is configured to assign a bit resource which bears an MCCH modification indication for each MCCH according to the available resource of paging indication signaling and the maximum number of MCCHs supported by a cell, and configure mapping information of each MCCH modification indication in the paging indication signaling; and the transmitting module is configured to make the MCCH modification indication corresponding to the configured MCCH included in the paging indication signaling before transmitting the paging indication signaling.

The transmitting module is further configured to preset, in each UE of the cell, the bit resource occupied by each MCCH modification indication and the mapping information of each MCCH modification indication in the paging indication signaling, or transmit them to each UE through the system information.

The network side configures the mapping information of each MCCH modification indication in the paging indication signaling in any one of the following ways:

(a) the network side continuously populate the paging indication signaling with the MCCH modification indication corresponding to the configured MCCH;

at this moment, the mapping information of each MCCH modification indication in the paging indication signaling is the arrangement order and the initial position, on the PDCCH, of the MCCH modification indication corresponding to each configured MCCH; the arrangement order can be the order of each MCCH appears when a plurality of MCCHs are configured in a system message, which is represented in order; the initial position represents a starting bit of the paging indication signaling which is populated with first MCCH modification indication. Typically, the initial position is the first bit;

the network side populates a corresponding position on the PDCCH with the MCCH modification indication corresponding to the configured MCCH, and populates a position, where the MCCH modification indication corresponding to the unconfigured MCCH is located, with 0 or other invalid values;

(b) the mapping information configured by the network side is the arrangement order of all the MCCH modification indications on the PDCCH, which is a corresponding way of determining which bit according to a value of MBSFN Area ID (or MCCH ID);

in the case that each modification indication is configured to occupy 1 bit and the initial position starts from the first bit of the PDCCH, the MCCH modification indication with MBSFN Area ID of 6 is mapped to the sixth bit on the PDCCH. In such a situation, if the MBSFN Area IDs of a plurality of the configured MCCHs are not continuous, a plurality of MCCH modification indications on the PDCCH are not continuous, either;

the network side populates a corresponding position on the PDCCH with the MCCH modification indication corresponding to the configured MCCH, and populates a position, where the MCCH modification indication corresponding to the unconfigured MCCH is located, with 0 or other invalid values;

the network side is further configured to make the MBSFN Area ID (or MCCH ID) corresponding to each configured MCCH included in the system information before transmitting the system information; and (c) the mapping information configured by the network side is the arrangement order of all the MCCH modification indications on the PDCCH, in which the MBMS single frequency network area identifications corresponding to the configured MCCHs are orderly arranged from small to large or from large to small;

the network side populates a corresponding position on the PDCCH with the MCCH modification indication corresponding to the configured MCCH, and populates a position, where the MCCH modification indication corresponding to the unconfigured MCCH is located, with 0 or other invalid values;

the network side is further configured to make the MBMS single frequency network area identification corresponding to each configured MCCH included in the system information before transmitting the system information.

The above network side may be a base station or an MCE (MBMS Coordination Entity).

Embodiment Two:

This embodiment provides a system for transmitting an MBMS paging indication signaling, and the system includes a network side and a UE; wherein the network side is configured to assign bit resource which bears an MCCH modification indication for each MCCH according to the available resource of paging indication signaling and the maximum number of MCCHs supported by a cell, and configure mapping information of each MCCH modification indication in the paging indication signaling; one MCCH occupies one bit (or more bits) with all bits being arranged in order;

the network side is further configured to make the MCCH modification indication corresponding to the configured MCCH included in the paging indication signaling before transmitting the paging indication signaling, and preset the bit resource occupied by each MCCH modification indication and the mapping information of each MCCH modification indication in the paging indication signaling in each UE of the cell, or transmit them to each UE through the system information; and the UE is configured to determine whether the content of each configured MCCH has changed according to the received MCCH modification indication corresponding to each MCCH.

The above network side may be a base station or an MCE.

Method Embodiments

Embodiment One:

This embodiment provides a method for transmitting an MBMS paging indication signaling. A network side assigns bit resource which bears an MCCH modification indication for each MCCH according to the available resource of paging indication signaling and the maximum number of multipoint control channels (MCCHs) supported by a cell, and configures mapping information of each MCCH modification indication in the paging indication signaling; one MCCH occupies one bit (or more bits) with all bits being arranged in order; the network side makes the MCCH modification indication corresponding to the configured MCCH included in the paging indication signaling before transmitting the paging indication signaling.

Embodiment Two:

This embodiment provides a method for transmitting an MBMS paging indication signaling. A network side assigns bit resource which bears an MCCH modification indication for each MCCH according to the available resource of paging indication signaling and the maximum number of Multipoint Control Channels (MCCHs) supported by a cell, and configures mapping information of each MCCH modification indication in the paging indication signaling; one MCCH occupies one bit (or more bits); the network side makes the MCCH modification indication corresponding to the configured MCCH included in the paging indication signaling before transmitting the paging indication signaling; and the UE determines whether the content of each configured MCCH has changed according to the received MCCH modification indication corresponding to each MCCH.

The number of bits (1 bit or n bits) occupied by each MCCH modification indication can be preset in the standard, and also can be configured in the sent system message and sent to each UE. The disclosure provides no limitation thereto.

When the available resource of the paging indication signaling changes or the maximum number of MCCHs supported by the cell varies, the network side reassigns the number of bits for each MCCH modification indication.

The method of the disclosure will be introduced in detail by the several application instances below.

Application Example One:

The network side continuously populates the PDCCH with the MCCH modification indication corresponding to the configured MCCH, and herein the mapping information of each MCCH modification indication on the PDCCH is the arrangement order and the initial position, on the PDCCH, of the MCCH modification indication corresponding to each configured MCCH; the above arrangement order can be the order of each MCCH appears when a plurality of MCCHs are configured in a system message, and the initial position represents a starting bit of the PDCCH which is populated with the first MCCH modification indication.

If the sum of bits occupied by the configured MCCH modification indication corresponding to each MCCH is n, if starting from the $m^{th}$ bit of the PDCCH is populated with the configured MCCH modification indication, the $m^{th}$ to the $(m+n-1)^{th}$ bits of the PDCCH are used for bearing the MCCH modification indication. If the number of MCCHs actually configured is less than the maximum number of MCCHs supported by the cell, other bits of the PDCCH which are not populated with MCCH modification indication are populated with 0 or other invalid values.

The network side can preset the mapping information of each MCCH modification indication on the PDCCH in each UE of the cell, and also can make the mapping information of each MCCH modification indication on the PDCCH included in the system information before transmitting the system information.

The UE learns the starting bit of the PDCCH which is populated with the MCCH modification indication according to the mapping information of each MCCH modification indication on the PDCCH, and the arrangement order of each configured MCCH modification indication. The UE determines whether the content of the corresponding MCCH will change through monitoring the MCCH modification indication.

For example, if the number of MCCHs supported by the cell is up to 8, the bit number for PDCCH DCI format 1A bearing the MBMS notification indication information is 25 bits, and assign 3 bits to paging indication of each MCCH.

If the system configures 5 MCCHs actually, corresponding MCCH IDs (in one-to-one correspondence with MBSFN Area ID) are respectively 1, 3, 5, 7 and 8, and appear in configuration list in the system message in the order of 1, 3, 5, 7 and 8. If the PDCCH is continuously populated with the MCCH modification indications corresponding to the above 5 MCCHs starting from the first bit of the PDCCH, the effect after populating is as shown in FIG. 1. That is, the first to the fifteenth bits of the paging indication signaling are populated with the MCCH modification indication, and the subsequent blank portions are not populated with the MCCH modification indication. The effect after populating is as shown in FIG. 1.

Preferably, the network side populates the PDCCH with the MCCH modification indication in order according to the order of MCCH configured in the system message. That is, the MCCH modification indication corresponding to the MCCH configured earlier is arranged before the MCCH modification indication corresponding to the MCCH configured later.

Application Example Two:

The mapping information configured by the network side is the arrangement order of all MCCH modification indications on the PDCCH, in which MCCH IDs (in one-to-one correspondence with MBSFN Area IDs) corresponding to all the MCCHs are arranged from small to large (or from large to small), and the corresponded bit is determined according to the value of the MCCH ID. Further the position of each MCCH on the PDCCH keeps unchanged.

The network side populates a corresponding position on the PDCCH with the MCCH modification indication corresponding to the configured MCCH, and populates a position, where the MCCH modification indication corresponding to the unconfigured MCCH is located, with 0 or other invalid values; in such a way, whether the number of the configured MCCHs reaches the maximum of MCCHs supported by a cell, the position of MCCH modification indication corresponding to each configured MCCH on the PDCCH keeps unchanged.

At that moment, the network side makes each configured MCCH ID or one-to-one MBSFN Area ID included in the system information before transmitting the system information.

The network side can preset the configured mapping information in each UE of the cell, and also can make the mapping information of each MCCH modification indication on the PDCCH included in the system information before transmitting the system information.

The UE learns the identification corresponding to each configured MCCH or one-to-one MBSFN Area ID with each configured MCCH according to the system information to further know the bit positions of the MCCH modification indications corresponding to the MCCHs on the PDCCH, and determines whether the content of the corresponding MCCH will change through monitoring the MCCH modification indications on these position.

Figure 2:
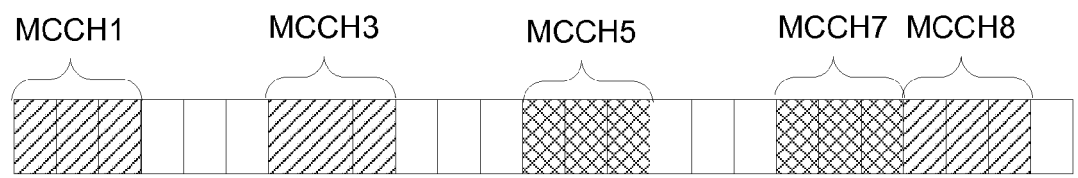
FIG. 2 is a diagram showing the mapping of the MCCH modification indication corresponding to the configured MCCH to the PDCCH in embodiment two of the disclosure.

For example, the number of MCCHs supported by the cell is up to 8, the size of DCI format 1A of PDCCH bearing the MBMS notification indication information is 25 bit, and the number of bits occupied by each MCCH is 3 bit, and then the position of the MCCH modification indication on the PDCCH is set according to MCCH ID (or one-to-one MBSFN Area ID). If the number of configured MCCHs is 5, and corresponding MCCH IDs are respectively 1, 3, 5, 7 and 8, the effect after populating is as shown in FIG. 2, wherein the shaded portions represent the positions of the MCCH modification indications corresponding to the configured MCCHs on PDCCH, and the blank portions represent the positions, on the PDCCH, of the MCCH modification indications corresponding to the unconfigured MCCHs.

Application Example Three:

The mapping information configured by the network side is the arrangement order of all MCCH modification indications on the PDCCH, in which MCCH IDs or MBMS single frequency network area IDs corresponding to all the MCCHs are arranged from small to large or from large to small in order.

The network side populates a corresponding position on the PDCCH with the MCCH modification indication corresponding to the configured MCCH, and populates a position, where the MCCH modification indication corresponding to the unconfigured MCCH is located, with 0 or other invalid values; in such a way, when the number of configured MCCHs changes, the position of each MCCH on the PDCCH may change according to a new order.

Figure 3:
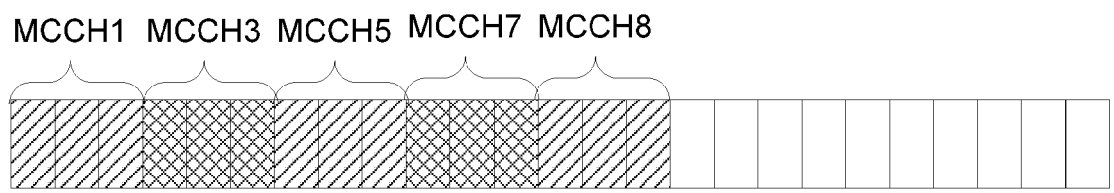
FIG. 3 is a diagram showing the mapping of the MCCH modification indication corresponding to the configured MCCH to the PDCCH in embodiment three of the disclosure.

For example, the number of MCCHs supported by the cell is up to 8, the size of DCI format 1A of PDCCH bearing the MBMS notification indication information is 25 bit, and the number of bits occupied by each MCCH is 3 bit, and then the positions of the MCCH modification indications on the PDCCH is set according to MBSFN Area IDs corresponding to the MCCHs from small to large order. If the number of configured MCCHs is 5, and corresponding MCCH IDs are respectively 1, 3, 5, 7 and 8 according to MBSFN Area IDs from small to large order, the effect after configuration is as shown in FIG. 3, wherein the shaded portions represent the positions of the configured MCCHs on the PDCCH, and the blank portions represent the positions of the unconfigured MCCHs on the PDCCH.

The network side can preset the mapping information of each MCCH modification indication on the PDCCH in each UE of the cell, and also can make the mapping information of each MCCH modification indication on the PDCCH included in the system information before transmitting the system information; the mapping information indicates the MBSFN Area ID corresponding to each configured MCCH.

At that moment, the network side makes the MBMS single frequency network area identification of each configured MCCH included in the system information before transmitting the system information.

The UE learns the MBSFN Area ID corresponding to each configured MCCH to further know the bit position of the MCCH modification indication on the MBMS notification indication information, and determines whether the content of the MCCH will change through monitoring the MCCH modification indication on the bit position.

MBSFN Area ID and MCCH ID in the above embodiments can also be identification of other forms, as long as a corresponding MBMS service area can be identified uniquely and the area corresponds to an MCCH.

Although the present disclosure is described in conjunction with specific embodiments, modifications and changes can be performed by those skilled in the art without departing from the spirit or scope of the disclosure. Such modifications and changes are intended to be included within the scope of the disclosure and the appended claims.

Industrial Applicability

The disclosure provides a method and system for sending and transmitting an MBMS paging indication signaling, which can be applied to the scenario in which there have a plurality of MCCHs in a cell and are not suffered from the number change of the MCCHs. The disclosure can be easily carried out, and the UE determines whether the content of the MCCH has changed only according to the MCCH modification indication corresponding to the MCCH concerned by the UE.

What is claimed is:

1. A method for transmitting Multimedia Broadcast Multicast Service (MBMS) paging indication signaling, comprising:
   assigning, by a network side, bit resource which bears a Multipoint Control Channel (MCCH) modification indication for each MCCH according to available resources of paging indication signaling and a maximum number of MCCHs supported by a cell, and configuring mapping information of each MCCH modification indication in the paging indication signaling by the network side; and
   the MCCH modification indication corresponding to the configured MCCH being included in the paging indication signaling which is transmitted by the network side;
   wherein the available resource of the paging indication signaling is a Physical Downlink Control Channel (PDCCH) which bears the paging indication signaling;
   in step of transmitting the paging indication signaling by the network side, the network side continuously or separately populates the PDCCH with the MCCH modification indication corresponding to the configured MCCH; and
   the mapping information of the each MCCH modification indication in the paging indication signaling is an arrangement order and an initial position, on the PDCCH, of the MCCH modification indication corresponding to each configured MCCH.

2. The method according to claim 1, wherein
the arrangement order of the MCCH modification indication on the PDCCH is the order of each MCCH appears when a plurality of MCCHs are configured in a system message; and
in the step of transmitting the paging indication signaling by the network side, the network side populates a corresponding position on the PDCCH with the MCCH modification indication corresponding to the configured MCCH, and populates a position, where the MCCH modification indication corresponding to the unconfigured MCCH is located, with an invalid value.

3. The method according to claim 1, wherein
the arrangement order of the MCCH modification indication on the PDCCH is the bit position determined by values of MCCH identifications corresponding to all the MCCHs or values of MBMS single frequency network area identifications corresponding to all the MCCHs;
in the step of transmitting the paging indication signaling by the network side, the network side populates a corresponding position on the PDCCH with the MCCH modification indication corresponding to the configured MCCH, and populates a position, where the MCCH modification indication corresponding to the unconfigured MCCH is located, with an invalid value; and
the method further comprises that: the MBMS identification or single frequency network area identification of each configured MCCH is included in system information which is transmitted by the network side.

4. The method according to claim 1, wherein
the arrangement order of the MCCH modification indication on the PDCCH is the order in which the MCCH identification or the MBMS single frequency network area identification corresponding to the configured MCCH are orderly arranged from small to large or from large to small;
in the step of transmitting the paging indication signaling by the network side, the network side populates a corresponding position on the PDCCH with the MCCH modification indication corresponding to the configured MCCH, and populates a position, where the MCCH modification indication corresponding to the unconfigured MCCH is located, with an invalid value; and
the method further comprises that: each configured MCCH identification or MBMS single frequency network area identification is included in system information which is transmitted by the network side.

5. The method according to claim 1, further comprising:
presetting, in each UE of the cell, the bit resource assigned by the network side for each MCCH modification indication and the mapping information of each MCCH modification indication in the paging indication signaling, or transmitting them to each UE through system information by the network side.

6. An apparatus for transmitting Multimedia Broadcast Multicast Service (MBMS) paging indication signaling, which is applied to a network side, and the apparatus comprising: a configuration module and a transmitting module, which are connected with each other; wherein
the configuration module is configured to assign bit resource which bears a Multipoint Control Channels (MCCH) modification indication for each MCCH according to available resource of paging indication signaling and a maximum number of MCCHs supported by a cell, and configure mapping information of each MCCH modification indication in the paging indication signaling;—wherein the available resource of the paging indication signaling is a Physical Downlink Control Channel (PDCCH) which bears the paging indication signaling; and
the transmitting module is configured to make the MCCH modification indication corresponding to the configured MCCH included in the paging indication signaling before transmitting the paging indication signaling, and continuously or separately populate the PDCCH with the MCCH modification indication corresponding to the configured MCCH;
wherein the mapping information of the each MCCH modification indication in the paging indication signaling is an arrangement order and an initial position, on the PDCCH, of the MCCH modification indication corresponding to each configured MCCH.

7. The apparatus according to claim 6, wherein the transmitting module is further configured to preset, in each UE of the cell, the bit resource occupied by each MCCH modification indication and the mapping information of each MCCH modification indication in the paging indication signaling, or transmit them to each UE through system information.

8. A UE for transmitting Multimedia Broadcast Multicast Service (MBMS) paging indication signaling, the UE is configured to learn mapping information of each MCCH modification indication in the paging indication signaling and receive the MCCH modification indication from a network side; wherein available resource of the paging indication signaling is a Physical Downlink Control Channel (PDCCH) which bears the paging indication signaling; and
the UE is configured to determine whether the content of each configured MCCH has changed according to the received MCCH modification indication corresponding to each MCCH; wherein the received MCCH modification indication corresponding to each MCCH populates the PDCCH continuously or separately by means of the network side;
wherein the mapping information of the each MCCH modification indication in the paging indication signaling is an arrangement order and an initial position, on the PDCCH, of the MCCH modification indication corresponding to each configured MCCH.

9. The UE according to claim 8, wherein the UE is configured to learn mapping information of each MCCH modification indication by means of system information received from a network side, or by means of that the network side presetting the mapping information in the UE.

* * * * *